United States Patent
Velasquez et al.

(10) Patent No.: US 9,539,689 B2
(45) Date of Patent: Jan. 10, 2017

(54) ROTARY UNION UTILIZING VACUUM EXTRACTION

(75) Inventors: Thomas R. Velasquez, Camarillo, CA (US); Cody J. Carothers, Oxnard, CA (US); Gene F. Haas, Camarillo, CA (US)

(73) Assignee: HAAS AUTOMATION, INC., Oxnard, CA (US)

( * ) Notice: Subject to any disclaimer, the term of this patent is extended or adjusted under 35 U.S.C. 154(b) by 1156 days.

(21) Appl. No.: 13/545,934

(22) Filed: Jul. 10, 2012

(65) Prior Publication Data

US 2013/0014827 A1   Jan. 17, 2013

Related U.S. Application Data

(60) Provisional application No. 61/506,608, filed on Jul. 11, 2011.

(51) Int. Cl.
*B23Q 11/10*   (2006.01)

(52) U.S. Cl.
CPC ........ *B23Q 11/103* (2013.01); *Y10T 137/0379* (2015.04); *Y10T 137/7866* (2015.04)

(58) Field of Classification Search
CPC ......... B23Q 11/103; F16L 39/06; F16L 39/04; F16L 55/07
See application file for complete search history.

(56) References Cited

U.S. PATENT DOCUMENTS

| | | |
|---|---|---|
| 4,560,144 A | 12/1985 | Williams et al. |
| 5,174,614 A | 12/1992 | Kaleniecki |
| 5,538,292 A * | 7/1996 | Sommer ............. F16L 27/0808 137/580 |
| 5,577,775 A * | 11/1996 | Pearson ................ F16L 27/082 285/24 |
| 6,308,734 B1 | 10/2001 | Smith et al. |
| 6,327,946 B1 * | 12/2001 | Felter ....................... B23B 1/00 82/1.11 |
| 6,533,509 B1 | 3/2003 | Antoun |

(Continued)

OTHER PUBLICATIONS

"G Rotary Unions for coolant, water, oil and air service," Brochure: Kadant Johnson Inc. 2011 pp. 1-20.

(Continued)

*Primary Examiner* — Thomas E Lazo
*Assistant Examiner* — Abiy Teka
(74) *Attorney, Agent, or Firm* — McDermott Will & Emery LLP (57) ABSTRACT

A rotary union including a housing, a piston, and a shaft is provided. The piston has a first fluid passage therethrough and is configured to slide axially between a first position and a second position. The shaft has a second fluid passage therethrough and is configured to rotate. A first port is arranged in the housing and is in fluid communication with a cavity formed between the housing and the piston. The first port is configured to deliver a pressurized fluid into the cavity to actuate the piston from the first position to the second position. A chamber is formed in the housing and surrounds an interface between the first and second fluid passages. A second port arranged in the housing is in fluid communication with the chamber. The second port is configured to apply a vacuum to the chamber to evacuate fluid leaked into the chamber from the interface.

18 Claims, 7 Drawing Sheets

(56) References Cited

U.S. PATENT DOCUMENTS

| | | |
|---|---|---|
| 7,597,360 B2 | 10/2009 | Kubala |
| 7,692,553 B2 | 4/2010 | Kubala |
| 7,815,224 B2 | 10/2010 | Ford et al. |
| 2006/0273579 A1* | 12/2006 | Ford ................... F16L 27/082 285/93 |

OTHER PUBLICATIONS

"Kadant Rotary Joints, Rotary Unions, and Rotating Unions," retrieved from <http://www.kadant.com/fluid_handling/rotary_joints/rotary_joints.html>, visited Jun. 17, 2011.
"Rotating Unions," Brochure: Deublin Company, 2011, pp. 1-3; 45-56.

* cited by examiner

SECTION
A-A

SECTION
B-B

FIG. 5A

SECTION
B-B

ROTARY UNION UTILIZING VACUUM EXTRACTION

CROSS-REFERENCES TO RELATED APPLICATIONS

The present application claims the benefit of U.S. Provisional Patent Application Ser. No. 61/506,608, entitled "Tool Spindle Cooling System," filed on Jul. 11, 2011, which is hereby incorporated by reference in its entirety for all purposes.

FIELD

The present invention generally relates to rotary unions, and more particularly to a rotary union utilizing vacuum extraction.

BACKGROUND

Machine tool spindles such as those used in computer numerical control (CNC) machines, may require a method of transferring media to cool cutting or milling bits due to the high temperature that is created when metals or other materials are machined and extract chips during this process. Conventionally, cutting and milling bits are cooled with a coolant fluid that is provided by a rotary union. A rotary union may generally comprise a stationary portion and a rotating portion. The stationary portion and the rotating portion are joined by a union. The union may comprise one or more seals configured to allow rotation of the rotating portion relative to the stationary portion. The seals are also configured to allow the coolant fluid to pass therethrough for cooling of the tool spindle.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to various aspects of the subject technology, a rotary union is provided. The rotary union comprises a housing and a piston disposed within and extending through a proximal portion of the housing. The piston comprises a first fluid passage therethrough and is configured to slide axially between a first position and a second position with respect to the housing. The rotary union also comprises a shaft disposed within and extending through a distal portion of the housing. The shaft comprises a second fluid passage therethrough and is configured to rotate with respect to the housing and the piston. A first port is arranged in the proximal portion of the housing and is in fluid communication with a cavity formed between the housing and the piston. The first port is configured to deliver a pressurized fluid into the cavity to actuate the piston from the first position to the second position. The first fluid passage of the piston is in fluid communication with the second fluid passage of the shall when the piston is in the second position. A chamber is formed between the proximal and distal portions of the housing and surrounds an interface between the first fluid passage of the piston and the second fluid passage of the shaft. A second port is arranged in the distal portion of the housing and is in fluid communication with the chamber. The second port is configured to apply a vacuum to the chamber to evacuate fluid leaked into the chamber from the interface between the first fluid passage of the piston and the second fluid passage of the shaft.

In accordance with one aspect of the subject technology, a method for evacuating coolant fluid from a rotary union is provided. The method comprises delivering a pressurized fluid through a first port arranged in a proximal portion of a housing, the pressurized fluid in fluid communication with a first cavity formed between the housing and a piston disposed within and extending through the proximal portion of the housing. The method further comprises slidably actuating the piston using the pressurized fluid from a first position to a second position in contact with a shaft, the shall disposed within and extending through a distal portion of the housing. The method also comprises passing the coolant fluid through a first fluid passage and a second fluid passage, the first fluid passage disposed within the piston, the second fluid passage disposed within the shaft. The method further comprises collecting coolant fluid leaked into a chamber formed between the proximal and distal portions of the housing and surrounding an interface between the first fluid passage of the piston and the second fluid passage of the shaft. The method also comprises evacuating the coolant fluid leaked into the chamber through a second port arranged in the distal portion of the housing in fluid communication with the chamber.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology, Tool spindles typically require cooling due to the high temperature that is generated when metals or other materials are machined with cutting or milling bits. Conventionally, tool spindles are cooled with a coolant fluid that is provided from a rotary union. A rotary union generally comprises a stationary portion and a rotating portion that are joined by a union. Coolant flowing through the stationary portion and the rotating portion may leak at the union. Extraction of the leaked coolant typically requires the use of a mechanical seal near the drain port. The seal at the drain port typically wears prematurely and creates a failure point, thereby requiring periodic replacement of the rotary union assembly.

Figure 1:
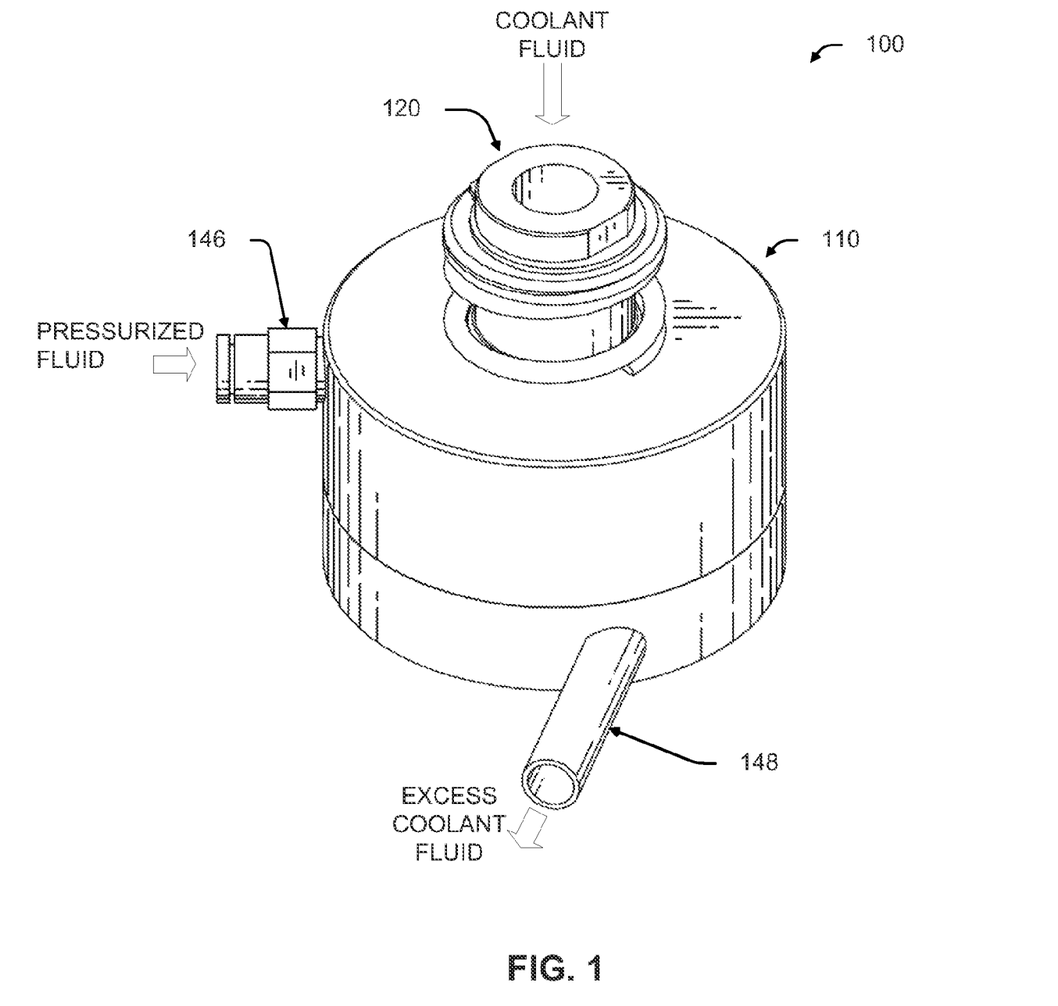
FIG. 1 illustrates an isometric view of an example rotary union, in accordance with various aspects of the subject technology.

According to various aspects of the subject technology, a method and apparatus for evacuating fluid from a rotary union are provided. FIG. 1 illustrates an isometric view of an example rotary union 100. The rotary union 100 comprises a housing 110, a piston 120, and a shaft 130 (not shown). The piston 120 and the shaft are configured to have a coolant fluid flow therethrough. An inlet port 146 is configured to provide pressurized fluid for actuation of the piston 120, as discussed further below. The housing 110 has a chamber therein for collecting coolant leaked into the chamber. A vacuum is applied to an evacuation port 148 during operation of the rotary union 100, to evacuate the coolant leaked into the chamber, without the need of a seal at a drain port. By eliminating high-wear components, such as the seal at a drain port, the rotary union 100 is reliable and robust compared to the conventional rotary union.

Figure 2:
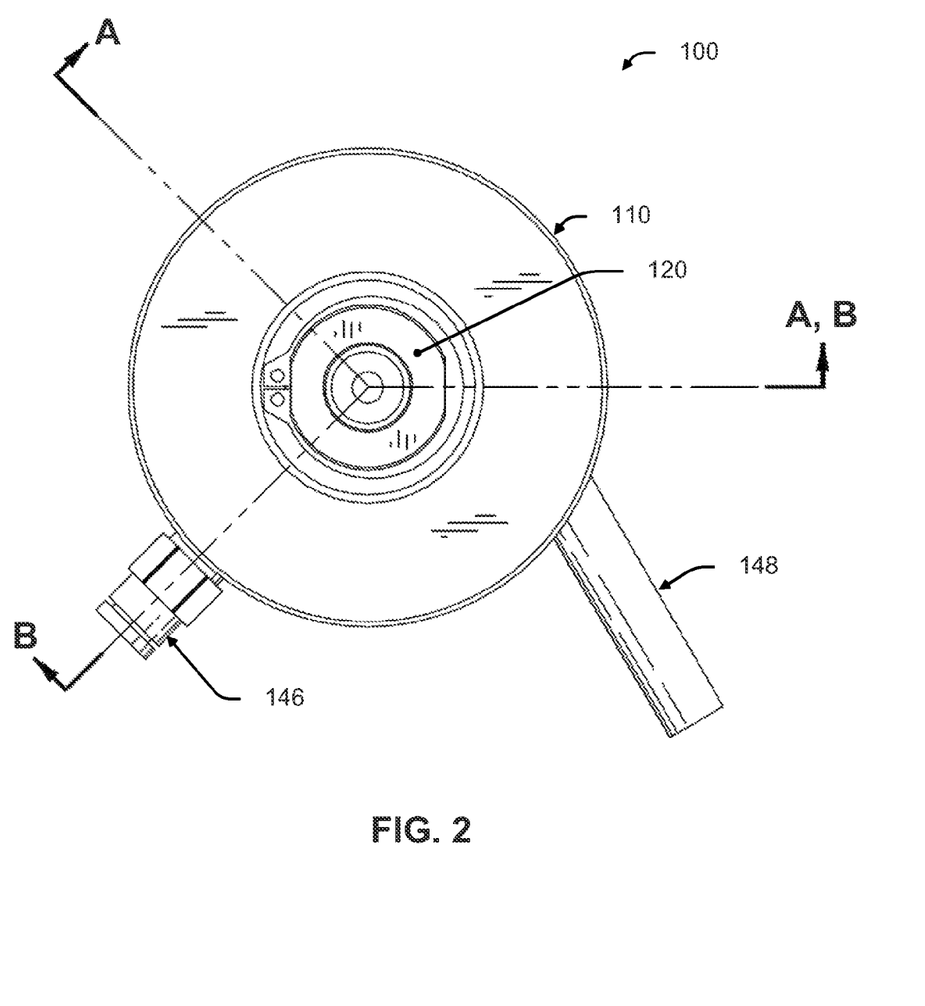
FIG. 2 illustrates a top view of an example rotary union, in accordance with various aspects of the subject technology.
Figure 3:
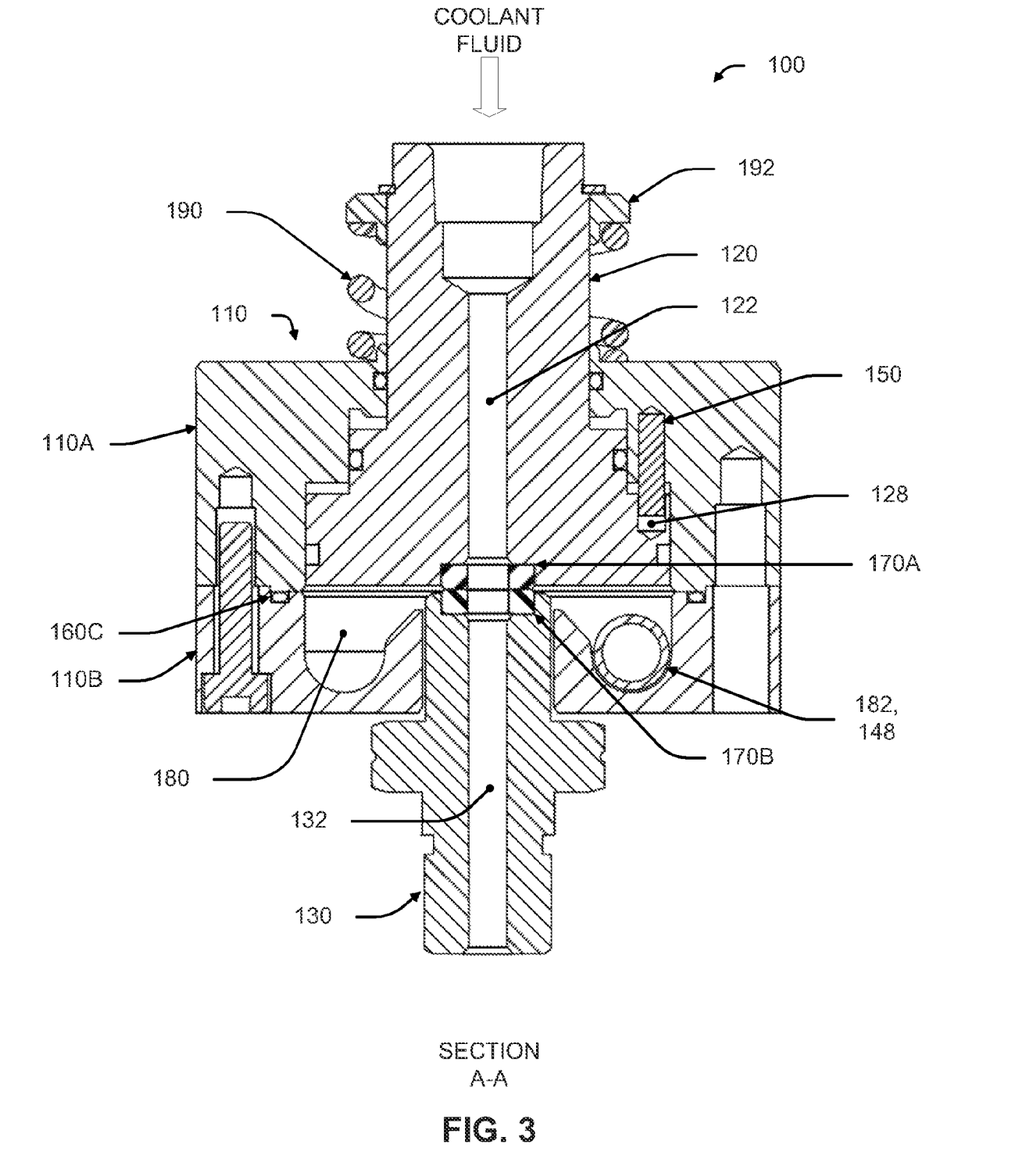
FIG. 3 illustrates a section view of an example rotary union, in accordance with various aspects of the subject technology.

FIG. 2 illustrates a top view of the example rotary union 100, shown in FIG. 1, and depicts section lines A-A and B-B which correspond to the section views of FIGS. 3 and 4A-5B, respectively. Referring to FIG. 3, the housing 110 comprises a proximal portion 110A and a distal portion 110B, The piston 120 is disposed within the housing 110 and extends through the proximal portion of the housing 110A. A proximal end of the piston 120 is configured to he detachably coupled to a cooling fluid source. The piston 120 has a first fluid passage 122 configured to be in fluid communication with the cooling fluid source. The first fluid passage 122 extends through the piston 120, from the proximal end of the piston 120 to a distal end of the piston 120. The first fluid passage 122 has varying diameters in order to facilitate coupling with the coolant fluid source. Al the proximal end of the piston 120, the first fluid passage 122 has a larger diameter than at the distal end of the piston 120. At an intermediate portion of the piston 120, the first fluid passage 122 has an intermediate diameter that is larger than the diameter at the distal end of the piston, but smaller than the diameter at the proximal end. Alternatively, the first fluid passage may have a generally constant diameter.

The shaft 130 is disposed within the housing 110 and extends through the distal portion of the housing 110B. The shaft 130 has a second fluid passage 132 extending therethrough from a proximal end of the shaft 130 to a distal end of the shaft 130. The second fluid passage 132 of the shaft 130 is arranged to receive the cooling fluid from the first fluid passage 122 of the piston 120, when the piston 120 is actuated toward the shaft, as discussed further below. The distal end of the shaft 130 is configured to he detachably coupled to a spindle arranged to receive the cooling fluid from the second fluid passage 132 of the shaft 130. In one aspect, the first fluid passage 122 and the second fluid passage 132 are axially aligned. Although the second fluid passage 132 has a generally constant diameter, it may have varying diameters.

The spindle detachably coupled to the shaft 130 may rotate at speeds up to 50,000 RPM as it performs various machining operations, such as drilling and milling. Accordingly, the shall 130 is configured to rotate with respect to the housing 110 and the piston 120 at speeds up to 50,000 RPM. The shaft 130 has a rotating surface configured to rotate within the housing 110. The rotating surface may be generally cylindrical in shape. The shaft 130 has an enlarged hexagonal portion at an intermediate section of the shaft 130 for facilitating coupling of the shaft 130 with a tool to the spindle. Other configurations may be used to facilitate coupling to the spindle.

The piston 120 is configured to slide axially between a first position and a second position with respect to the housing 110. For example, referring to FIGS. 4A and 5A, the piston 120 is shown in the first position. In FIGS. 4B and 5B, the piston 120 is shown in the second position. The piston 120 includes one or more sliding surfaces that are configured to contact corresponding sliding surfaces of the housing 110. The sliding surfaces of the piston and the housing may be generally cylindrical in shape. The piston 120 may have varying outer diameters. For example, at the distal end, the piston 120 may have a larger outer diameter than at the proximal end. The varying diameters of the piston 120 may form a stepped outer profile of the piston 120. The stepped portions of the piston 120 may thereby form one or more planar surfaces on the piston, which may be used for actuating the piston 120, as discussed further below.

Figure 4A:
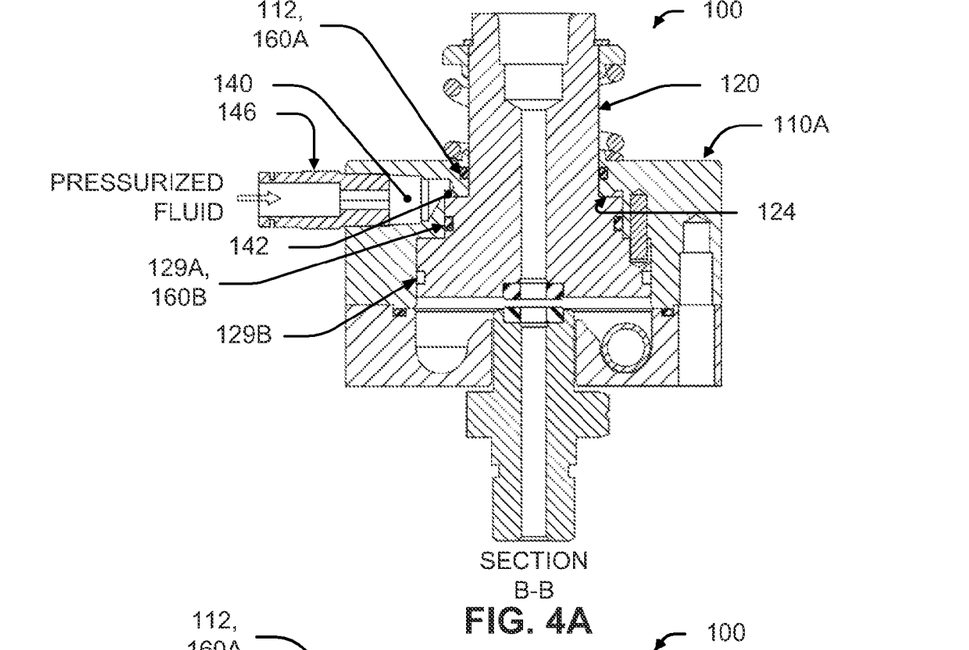
FIG. 4A illustrates a section view of an example rotary union, in accordance with various aspects of the subject technology.
Figure 4B:
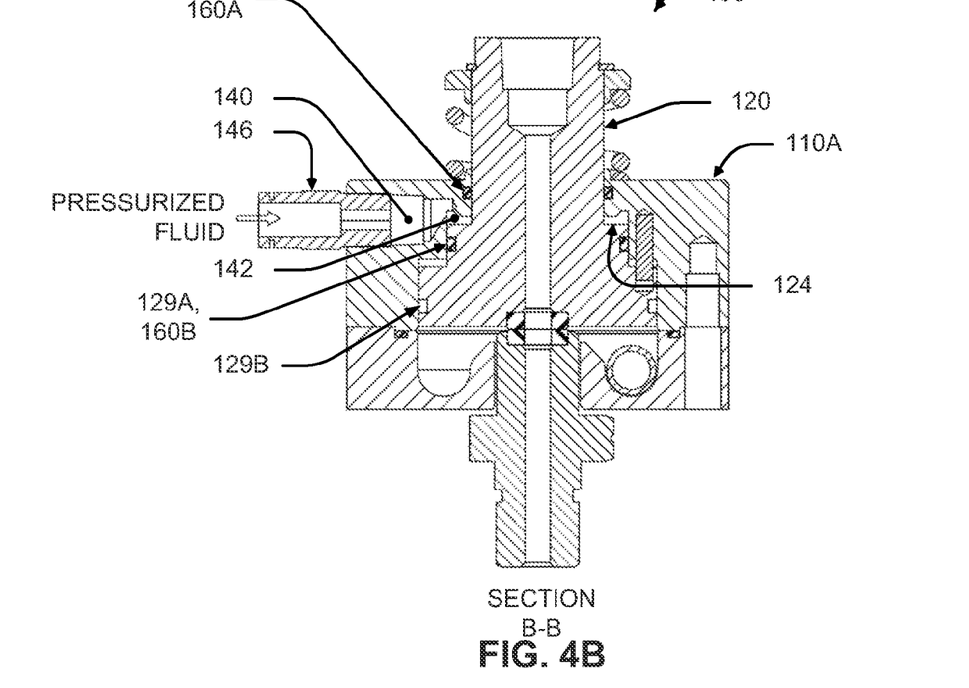
FIG. 4B illustrates a section view of an example rotary union, in accordance with various aspects of the subject technology.

Referring to FIGS. 4A and 4B, the piston 120 may be actuated between the first position to the second position by a pressure created by a pressurized fluid. The pressurized fluid is delivered through a first port 140 arranged in the proximal portion of the housing 110A. A nozzle 146 is configured to be detachably coupled to the first port 140. The nozzle 146 is also configured to be detachably coupled to a pressurized fluid source. The pressurized fluid may comprise pressurized air, gas, or liquid. If the pressurized fluid comprises pressurized air, the air may have a pressure of about 85 PSI.

The first port 140 is in fluid communication with a first cavity 142 formed between the housing 110A and the piston 120. Actuation of the piston 120 occurs when the pressure of the pressurized fluid in the first cavity 142 acts upon a pressure surface 124 of the piston 120 to generate an axial force. The pressure surface 124 may comprise the planar surface formed on the piston 120 by the stepped portions of the piston 120. The pressure surface 124, in fluid communication with the pressurized fluid in the first cavity 142, may have a surface area of about 0.70 in$^2$.

Figure 5A:
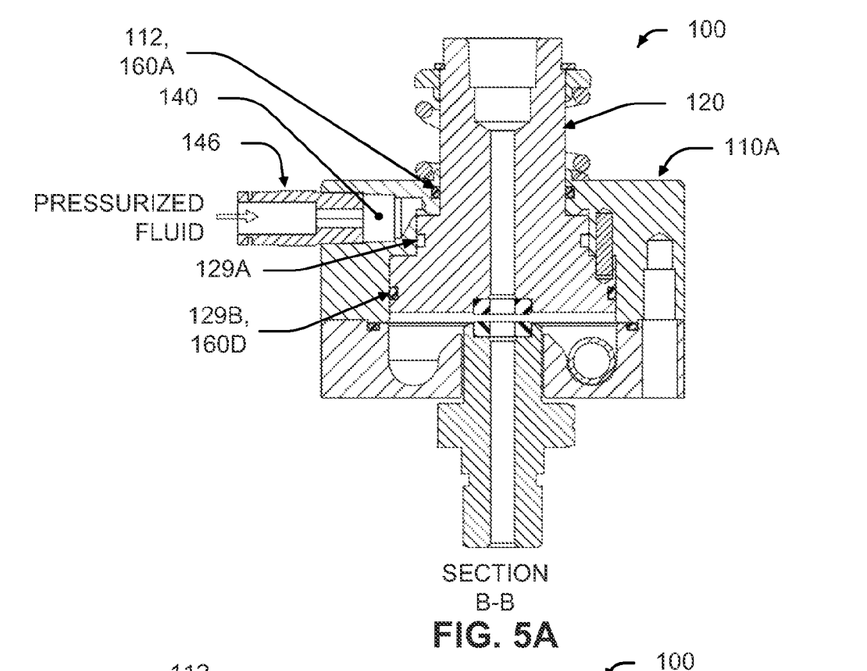
FIG. 5A illustrates a section view of an example rotary union, in accordance with various aspects of the subject technology.
Figure 5B:
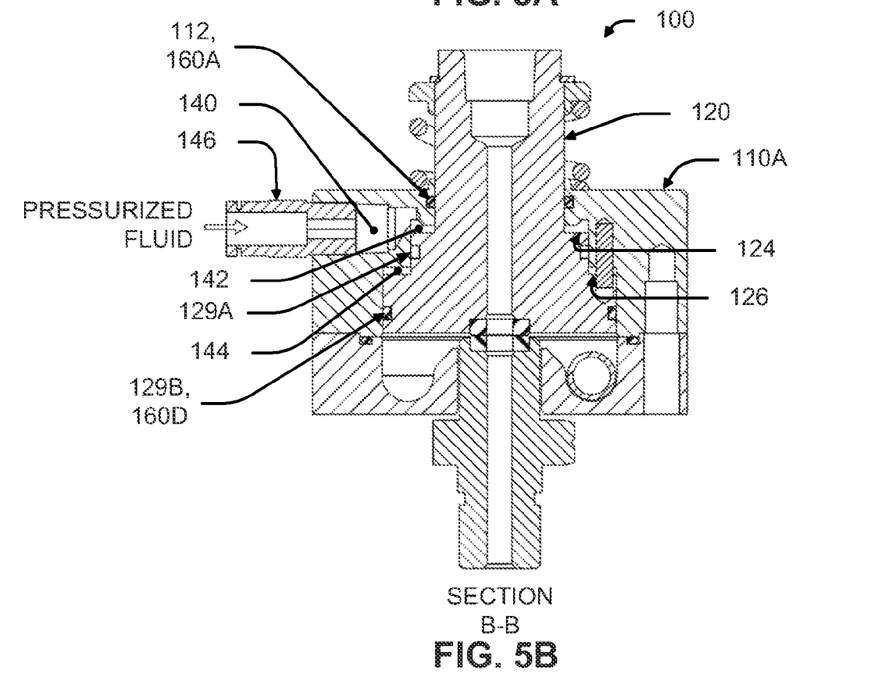
FIG. 5B illustrates a section view of an example rotary union, in accordance with various aspects of the subject technology.

In one aspect, the first port 140 may be configured to be in fluid communication with a second cavity 144, formed between the housing 110 and the piston 120. As shown in FIGS. 4A-5B, by modifying the placement of an o-ring, the first port 140 may either be in fluid communication with the first cavity 142, as shown in FIGS. 4A and 4B, or with the first and second cavities 142, 144 as shown in FIGS. 5A and 5B. Specifically, as shown in FIGS. 4A and 4B, if the o-ring 160B is disposed in a first channel 129A of the piston 120, then the first port 140 will be in fluid communication with only the first cavity 142. If, however, as shown in FIGS. 5A and 5B, an o-ring 160D is disposed in a second channel 129B of the piston 120, then the first port 140 will be in fluid communication with both the first cavity 142 and the second cavity 144. In this example, the pressurized fluid delivered from the first port 140 first flows into the first cavity 142 and then flows into the second cavity 144 via a clearance formed between an outer surface of the piston and an inner surface of the housing.

A proximal o-ring 160A may be disposed in a channel 112 of the housing 110. The proximal o-ring 160A prevents the pressurized fluid from leaking out of the first cavity 142 and the second cavity 144. The proximal o-ring 160A and the o-ring 160B or 160D thereby create a seal between the housing 110 and the piston 120 to prevent the pressurized fluid within the first cavity 142 or the second cavity 144 from leaking out of the first cavity 142 or the second cavity 144.

The pressurized fluid in the second cavity 144 acts upon a second pressure surface 126 of the piston 120 to generate additional axial force. The second pressure surface 126 may comprise another planar surface formed on the piston 120 by the stepped portions of the piston 120. The second pressure surface 126, in fluid communication with the pressurized fluid in the second cavity 144, may have a surface area of about 1.07 in$^2$. Accordingly, when the o-ring 160D is disposed in the second channel 129B, the total surface area of the first and second pressure surfaces is about 1.77 in$^2$.

Referring to FIG. 3, the rotary union 100 may comprise a first seat 170A disposed on the distal end of the piston 120, and a second seal 170B disposed on a proximal end of the shaft 130. When the piston 120 is in the second position, the first and second seals 170A, 170B form the interface between the first fluid passage 122 of the piston 120 and the second fluid passage 132 of the shaft 130. Thus, when the piston 120 is in the second position, the first fluid passage 122 is in fluid communication with the second fluid passage 132. The first and second seals 170A, 170B are configured to facilitate high speed rotation of the shaft 130 with respect to the piston 120, without excessive wearing of the piston 120 or the shaft 130. The first and second seals 170A, 170B may be formed of tungsten carbide.

The pressure of the pressurized fluid also affects a contact force between the piston 120 and the shaft 130. For example, a backpressure caused by the flow of the coolant fluid within the first passage 122 and the second passage 132 may tend to cause the first seal 170A to separate from the second seal 170B. To compensate for the separating force, the pressure of the pressurized fluid may be controllably increased to maintain a sufficient contact force between the first seal 170A and the second seal 170B. In one aspect, by increasing the pressure of the pressurized fluid, the amount of coolant leaked at the interface between the first fluid passage 122 and the second fluid passage 132 may be controllably reduced. in another example, if the backpressure caused by the flow of the coolant fluid within the first passage 122 and the second passage 132 reduced, the pressure of the pres- surized fluid may also be reduced to compensate for the reduced backpressure and thereby minimize wear of the first seal 170A and the second seal 170B which may otherwise be caused by a high contact force between the first seal 170A and the second seal 170B.

One or more dowel pins 150 may guide the piston 120 as it moves between the first position and the second position. A proximal portion of the dowel pin 150 may be secured to the housing 110, and a distal portion of the dowel pin 140 may slide within a guide hole 128 of the piston 120.

The proximal portion of the housing 110A and the distal portion of the housing 110B are configured to be joined together. The proximal and distal portions 110A, 110B may be held together by mechanical hardware, such as socket head cap screws. An o-ring 160C may be disposed between the proximal and distal portions 110A, 110B, The housing 110 includes a chamber 180 formed between the proximal and the distal portions of the housing 110A, 110B. The chamber 180 surrounds the interface between the first fluid passage 122 of the piston 120 and the second fluid passage 132 of the shaft 130 and is configured to collect any cooling fluid that may leak from the interface. The chamber 180 may have outer and inner side walls that converge to form a rounded base.

The housing 110 includes a second port 182 that is arranged in the distal portion of the housing 110B. The second port 182 may be configured to receive an extraction tube 148. The second port 182 is in fluid communication with the chamber 180 and is configured to apply a vacuum to the chamber 180 to evacuate coolant fluid leaked into the chamber 180 from the interface between the first fluid passage 122 and the second fluid passage 132. The vacuum applied to the second port 182 may be in a range of about 2.9 in-Hg and 3.2 in-Hg. The second port 182 may be disposed tangentially to the outer side wall and the rounded base of the chamber 180.

The rotary union 100 may also comprise a spring 190 configured to actuate the piston 120 from the second position to the first position in response to a reduction of pressure from the pressurized fluid in the first cavity 124 or the second cavity 126. The spring 190 may be disposed between the housing 110 and the piston 120. For example, a proximal end of the spring 190 may act against a cap 192 of the piston 120, and a distal end of the spring 190 may act against an outer surface of the proximal portion or the housing 110A. The spring 190 may be a compression spring designed to operate with a compression load. As the piston 120 moves to the second position by the pressurized fluid, the spring 190 is compressed. When the pressurized fluid is removed, the spring 190 returns the piston 120 to the first position.

Figure 6:
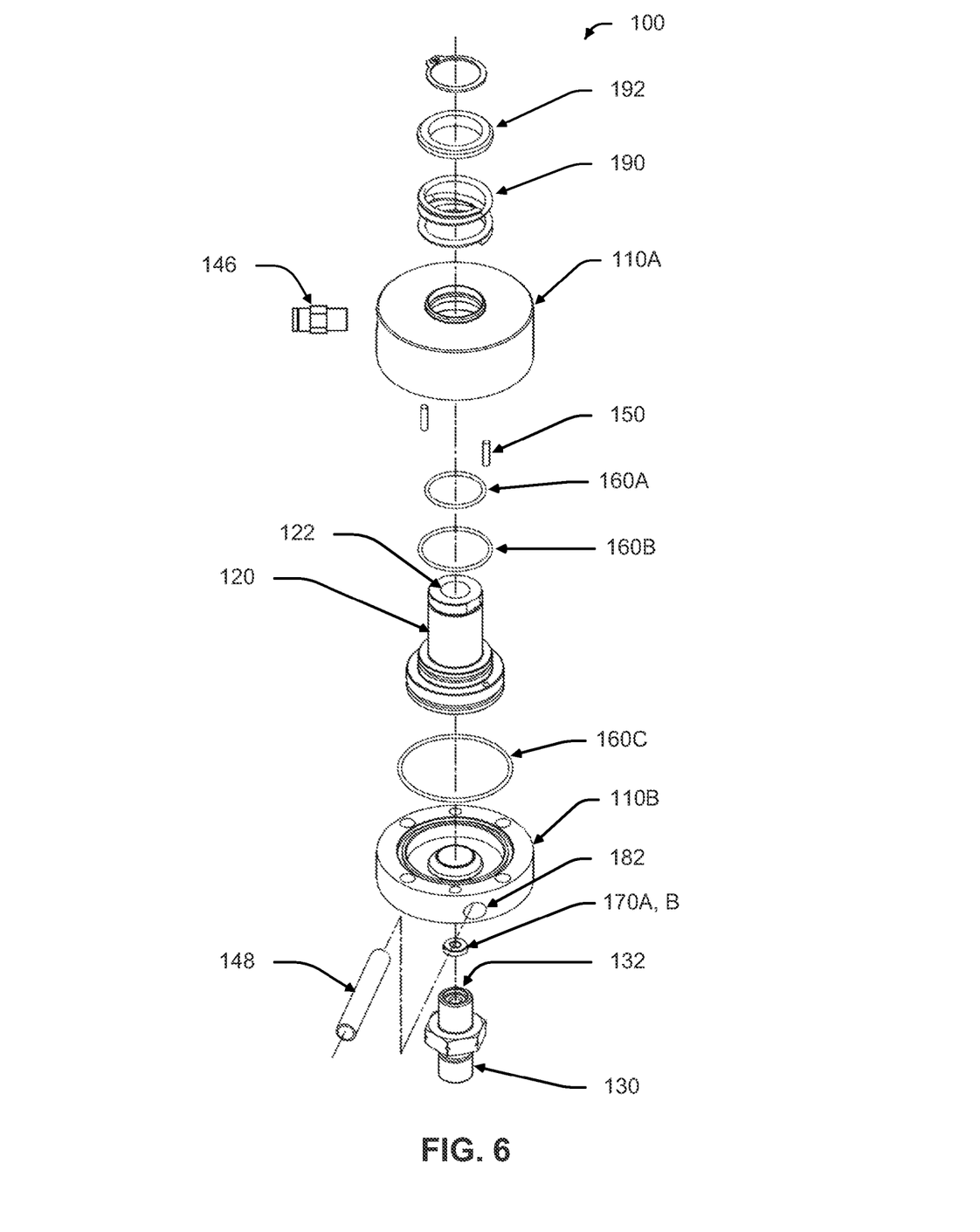
FIG. 6 illustrates an exploded view of an example rotary union, in accordance with various aspects of the subject technology.

FIG. 6 illustrates an exploded view of the example rotary union 100 and the various components thereof, as described above.

Figure 7:
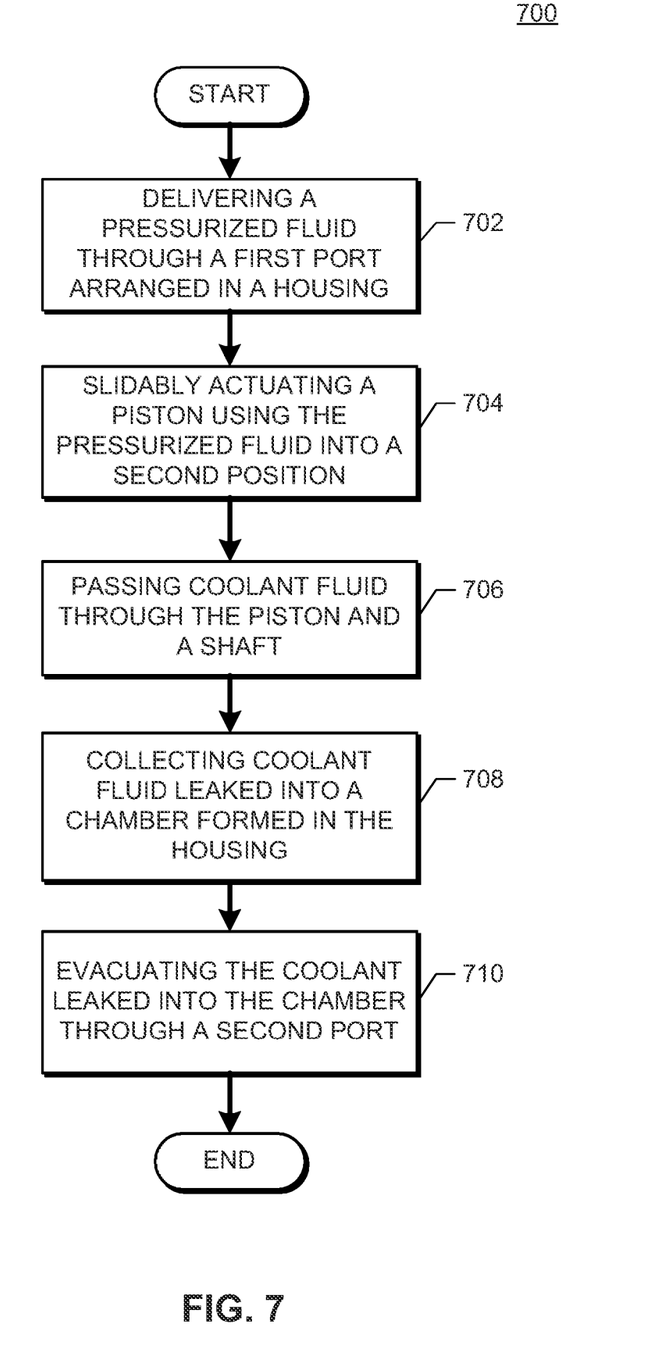
FIG. 7 illustrates an example method for evacuating fluid from a rotary union, in accordance with various aspects of the subject technology.

A method for evacuating fluid from the rotary union 100 will now be described. FIG. 7 illustrates an example method 700 for evacuating fluid from a rotary union, in accordance with various aspects of the subject technology. First, at step 702, the pressurized fluid is delivered through the first port 140. Next, at step 704, the pressurized fluid fills the first cavity 142 and slidably actuates the piston 120 from the first position to the second position, thereby causing the first seal 170A disposed on the distal end of the piston 120 and the second seal 170B disposed on the proximal end of the shaft 130, to contact each other. After the first and second seals 170A, 170B contact each other, a slight dwell may occur before the coolant fluid is introduced into the rotary union 100.

A contact force between the first and second seals 170A, 170B is created by the pressurized fluid when the piston 120 is in the second position. In one aspect, the contact force is sufficient to create an effective seal at the interface so as to prevent undesired leakage of the coolant fluid, while allowing any excess coolant fluid to leak from the interface in order to be purged through the second port 182.

In one aspect, a pressure compensating system monitors the pressure of the pressurized fluid and a pressure of the coolant fluid in order to maintain the contact force between the first and second seals 170A, 170B relative to the pressure of the coolant fluid. The pressure compensating system may maintain the contact force between the piston 120 and the shaft 130 by increasing or decreasing the pressure of the pressurized fluid such that a ratio of the contact force and the pressure of the coolant fluid is about 0.114 lbf per 1 PSI.

The pressure compensating system may comprise a first pressure sensor configured to measure the pressure of the pressurized fluid, a second pressure sensor configured to measure the pressure of the coolant fluid, and a controller configured to increase or decrease the pressure of the pressurized fluid in response to the measured pressure of the coolant fluid. The controller may increase or decrease the pressure of the pressurized fluid by controlling a pump that is in fluid communication with the pressurized fluid.

Alternatively, the contact force between the first and the second seals 170A, 170B may be adjusted by placement of the o-ring 160B in the first channel 129A, or by placement of the o-ring 160D in the second channel 129B. As discussed above, by placing the o-ring 160B, 160D in either the first or second channel 129A, 129B, the surface area used to generate the axial force may be altered. For example, when the o-ring 160B is disposed within the first channel 129A, the contact force between the first and the second seals 170A, 170B may be maintained up to a maximum pressure of the pressurized fluid of 300 PSI. When the o-ring 160D is disposed within the second channel 129B, the contact force between the first and the second seals 170A, 170B may be maintained up to a maximum pressure of the pressurized fluid of 1000 PSI.

At step 706, the coolant fluid is passed from the first fluid passage 122 to the second fluid passage 132 via the interface. At step 708, excess coolant fluid leaking from the interface is collected in the chamber 180. At step 710, the excess coolant fluid leaked into the chamber 180 is evacuated through the second port 182 by a vacuum applied to the second port 182. Upon removal of the pressurized fluid from the first port 140, the spring 190 returns the piston 120 to the first position, thereby separating the first seal 170A and the second seal 170B from each other.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom" "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A rotary union comprising:
   a housing;
   a piston disposed within and extending through a proximal portion of the housing, wherein the piston comprises a first fluid passage therethrough and is configured to slide axially between a first position and a second position with respect to the housing;
   a shaft disposed within and extending through a distal portion of the housing, wherein the shaft comprises a second fluid passage therethrough and is configured to rotate with respect to the housing and the piston;

a first port arranged in the proximal portion of the housing in fluid communication with a cavity formed between the housing and the piston, wherein the first port is configured to deliver a pressurized fluid into the cavity to actuate the piston from the first position to the second position; and wherein the first fluid passage of the piston is in fluid communication with the second fluid passage of the shaft and the piston is in contact with the shaft when the piston is in the second position;

a chamber formed between the proximal and distal portions of the housing and surrounding an interface between the first fluid passage of the piston and the second fluid passage of the shaft, wherein outer and inner sidewalls of the chamber converge into a rounded base; and a second port arranged in the distal portion of the housing in fluid communication with the chamber, wherein the second port is configured to apply a vacuum to the chamber to evacuate fluid leaked into the chamber from the interface between the first fluid passage of the piston and the second fluid passage of the shaft, and wherein the second port extends through the distal portion of the housing tangentially to the outer side wall at the second port and tangentially to the rounded base at the second port.

2. The rotary union of claim 1, wherein the first and second fluid passages are axially aligned.

3. The rotary union of claim 1, further comprising a spring configured to actuate the piston from the second position to the first position in response to a reduction of the pressurized fluid in the cavity.

4. The rotary union of claim 1, further comprising:
a first seal disposed on a distal end of the piston; and
a second seal disposed on a proximal end of the shaft, wherein the first and second seals form the interface between the first fluid passage of the piston and the second fluid passage of the shaft when the piston is in the second position.

5. The rotary union of claim 4, wherein the first and second seals are formed of tungsten carbide.

6. The rotary union of claim 1, wherein the pressurized fluid has a pressure of 85 PSI.

7. The rotary union of claim 1, wherein a proximal end of the piston is configured to be detachably coupled to a cooling fluid source arranged to deliver the cooling fluid to the first fluid passage of the piston.

8. The rotary union of claim 7, wherein a distal end of the shaft is configured to be detachably coupled to a spindle arranged to receive the cooling fluid from the second fluid passage of the shaft.

9. A method for evacuating coolant fluid from a rotary union, the method comprising:
delivering a pressurized fluid through a first port arranged in a proximal portion of a housing, the pressurized fluid in fluid communication with a first cavity formed between the housing and a piston disposed within and extending through the proximal portion of the housing;

slidably actuating the piston, using the pressurized fluid, from a first position to a second position in contact with a shaft, the shaft disposed within and extending through a distal portion of the housing;

passing the coolant fluid through a first fluid passage and a second fluid passage, the first fluid passage disposed within the piston, the second fluid passage disposed within the shaft;

collecting coolant fluid leaked into a chamber formed between the proximal and distal portions of the housing and surrounding an interface between the first fluid passage of the piston and the second fluid passage of the shaft, wherein outer and inner sidewalls of the chamber converge into a rounded base; and applying a vacuum to a second port to evacuate the coolant fluid leaked into the chamber through the second port, wherein the second port is arranged in the distal portion of the housing in fluid communication with the chamber, and wherein the second port extends through the distal portion of the housing tangentially to the outer side wall at the second port and tangentially to the rounded base at the second port.

10. The method of claim 9, further comprising maintaining a contact force between the piston and the shaft with the pressurized fluid such that a ratio of the contact force and a pressure of the coolant fluid is 0.114 lbf per 1 PSI.

11. The method of claim 9, wherein the evacuating comprises applying a vacuum to the second port in a range of 2.9 in-Hg and 3.2 in-Hg.

12. The method of claim 9, further comprising actuating the piston from the second position to the first position using a spring disposed between the housing and the piston.

13. The method of claim 9, wherein the pressurized fluid has a pressure of 85 PSI.

14. The method of claim 9, wherein the piston comprises a pressure surface that is in fluid communication with the pressurized fluid in the first cavity, the pressure surface of the piston in the first cavity having a surface area of 0.70 in$^2$.

15. The method of claim 9, wherein the pressurized fluid is in fluid communication with a second cavity formed between the housing and the piston.

16. The method of claim 15, wherein the piston comprises a pressure surface that is in fluid communication with the pressurized fluid in the second cavity, the pressure surface of the piston in the second cavity having a surface area of 1.07 in$^2$.

17. The method of claim 9, wherein the interface between the first fluid passage of the piston and the second fluid passage of the shaft when the piston is in the second position comprises a first seal disposed on a distal end of the piston and a second seal disposed on a proximal end of the shaft.

18. The method of claim 9, further comprising coupling a spindle to a distal end of the shaft, the spindle arranged to receive the cooling fluid from the second fluid passage of the shaft.

* * * * *